Dec. 10, 1968   J. J. KARASIEVICH   3,415,337
AIR INJECTOR DEVICE FOR AIR-COOLED NOISE SUPPRESSORS
Filed April 20, 1966   5 Sheets-Sheet 4

INVENTOR.
JULIAN J. KARASIEVICH
BY
ATTORNEY

United States Patent Office 3,415,337
Patented Dec. 10, 1968

3,415,337
AIR INJECTOR DEVICE FOR AIR-COOLED NOISE SUPPRESSORS
Julian J. Karasievich, Cincinnati, Ohio, assignor to General Electric Company, a corporation of New York
Filed Apr. 20, 1966, Ser. No. 543,987
11 Claims. (Cl. 181—51)

ABSTRACT OF THE DISCLOSURE

A jet engine ground waterless type noise suppressor directed primarily to the detailed aerodynamic structure of the injector means to introduce cooling air into the hot stream by use of a daisy or lobe arrangement using overlapping or shingled construction. The lobes are formed of curved wall members with upstream edges having flange means for forming slot-like openings for inducing the flow of secondary cooling air into the hot engine exhaust gas stream.

---

Associated with the expansion of new and existing airport facilities and the advent of jet powered aircraft, both military and commercial, has been the problem of noise. The present invention deals particularly with a new and improved device for use in equipment for ground run-up or maintenance checks on aircraft.

An aircraft type of gas turbine engine, e.g., a turbojet as is well known, provides a source of power for flight by means of the thrust imparted to the vehicle due to the high velocity, hot gas stream issuing from the engine tailpipe. Naturally, the pressure of such a rapidly moving gas stream is attended by noise created primarily by the process of combustion and the interaction of the hot gas stream with the relatively stationary air in the general area of the engine tailpipe. Means to eliminate or substantially reduce such noice have been devised, an example of which may be found in the patent to Lee et al., 3,227,240, of common assignment herewith. Some of the noise suppression devices have been particularly adapted for use with military aircraft having thrust augmented or afterburning engines. In this type of jet engine fuel is added in the tailpipe for more efficient combustion, which results in higher thrust for bursts of speed of limited duration. In testing of jet engines so equipped it is essential that a sound suppression device be utilized for both the safety and protection of maintenance personnel and the minimization of the effect of such highly disturbing noise on property owners adjacent the airfield. In addition, in afterburner equipped engines structural failure of the noise suppressor is a distinct possibility due to the increases in exhaust gas temperature and in acoustically generated vibrations due to turbulence.

It is known in the noise suppression art to provide means for introducing large amounts of cooling, or secondary air, into the hot primary exhaust gas stream, as illustrated in the referenced Lee, et al. patent. However, in the case of more modern engines of much higher thrust capacity the increased velocities and temperatures have indicated a need for improvement in the design of noise suppressors. An example of such apparatus utilizes a cold air mixing device of the so-called "daisy" injector configuration. In the "daisy" injector circumferentially-spaced lobes or generally triangularly-shaped (in cross-section) troughs project axially downstream and radially-inwardly of the fast moving engine exhaust so as to inject cool air directly into the hot gas stream. Such devices are particularly susceptible to severe buffeting and extremely high metal surface temperatures when used in the presence of the aforementioned thrust augmentors. In many instances previous attempts to protect the cold air inductors or lobes of the "daisy" from the effects of these higher temperature, higher velocity streams have proven unsuccessful.

Accordingly, the general object of the invention is to improve the aerodynamic configuration of an air injector device for use in noise suppression apparatus having lobed, fluid mixing means.

A more specific object is to improve the overall design of the cold air inductor portion of such devices to provide more uniform temperature distribution therein, so as to enhance the reliability and service life of the complete noise suppression apparatus.

Another more specific object of the invention is to improve the overall mechanical construction of an air injector device having a lobed or "daisy" type configuration, whereby maintenance and overhaul problems associated therewith are greatly simplified.

In its more broader sense the invention is characterized by a cold air lobe inductor construction featuring a plurality of slot-like, parallel openings in the wall structure thereof. The openings are preferably arranged in serial or cascade fashion with partial overlapping inwardly-turned (with respect to the direction and source of cold air flow) wall flange portions. This arrangement provides a uniform continuous film of cooling air on the hot gas side of the inductor lobe. A feature of the invention is the means whereby the side walls of the inductor-lobe— having the openings—are constructed of opposing pairs of elongated, generally rectangular vane-like members, each supported at one end from base or frame members. The vane-pairs are individually joined at the crest or part of deepest penetration of the inductor lobe by cap members, thereby providing means by which the vane pairs— in fact, the lobe walls—can twist and flex due to uneven thermal expansion without causing the high thermally-induced stresses which would otherwise be present. Additional strengthening features may be incorporated, as shown in the disclosed embodiment.

Still another aspect of my invention concerns improvements incorporated in the structure for controlling the hot gas flow areas intermediate the lobes or cold air passages in a manner aimed at reducing the average surface temperature of the lobe inductor wall structure. I achieve this by designing the injector device to have a constant rate of flow area increase from the entrance to the exit area thereof. Control of hot gas flow area, by specific contouring of the intermediate structure or panels joining the lobes, is effective to reduce the maximum overall lobe surface temperature, as well as the average temperature, through a more optimum distribution of relatively high temperature zones.

Other advantages and features of my invention, such as means facilitating maintenance and replacement of damaged parts, will become readily apparent as the invention is more distinctly pointed out in the appended claims. However, the invention both as to organization and operation is also described in detail by the following description, together with the accompanying drawings in which:

Figure 1:
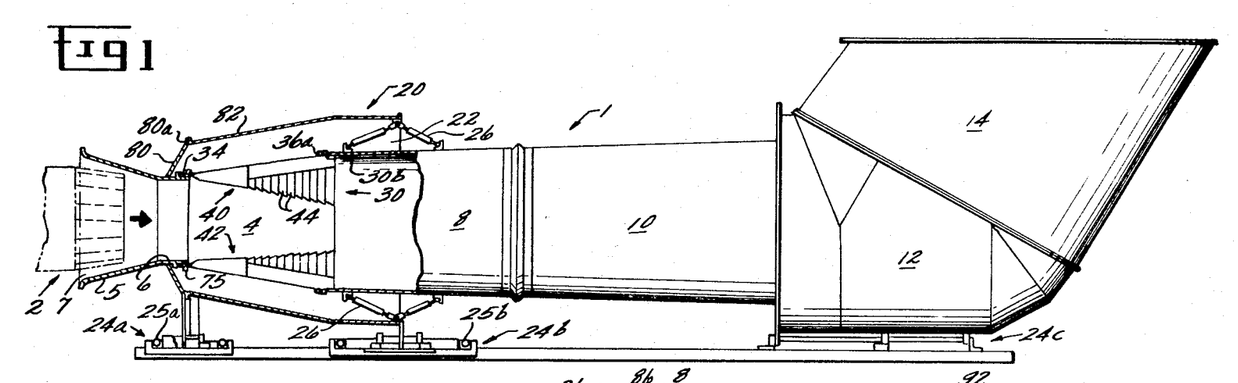
FIGURE 1 is a side elevation, partially cut-away and in cross-section of a noise suppression apparatus having an injector device incorporating improvements according to my invention.

Turning now more specifically to the drawings, FIGURE 1 illustrates a noise suppressor 1 in place, i.e., fixedly located and mounted with respect to an engine tailpipe 2, for engine testing or ground maintenance. The hot gases emanating from the tailpipe, as indicated by the large arrow in FIGURE 1, enter an injector-suppressor means 4 or as it is commonly called, a "daisy" type injector device. A coupling member 5 helps in funneling the exhaust gases through a tube 6, forming a throat, to the suppressor. Tube 6 is spaced from the tailpipe to provide an annular flow passage 7. It will be apparent that the injector action of the hot gases will cause air flow through passage 7 primarily for film cooling of the coupling member 5. Downstream of the injector assembly 4 is a mixing section 8 wherein the hot and cold fluid flow mixing action, initiated by the injector-suppressor device, actually takes place. In the mixing section 8 the total velocity and temperature of the fluid flow is reduced for discharge into a conical diffusion section 10. The mixed gases then pass through a plenum 12 and are finally discharged to atmosphere through a stack 14 containing suitable sound-absorbent baffle means (not shown), as more fully described in the aforementioned Lee et al. patent.

In order to provide the necessary large amounts of secondary or cooling air for use with afterburning-equipped engines, an outer, generally tubular casing or shroud 20 is provided to form an annular passage 22. The casing may be lined for increased sound absorption, or unlined as shown. The sound suppressor device 1 of FIGURE 1 is mounted at several locations on suitable base or pad means, indicated generally at 24a, 24b, and 24c. These pads may include roller members, such as those indicated at 25a and 25b, to permit thermal growth of the suppressor 1 with respect to the fixed mounting 24c. Adjustable members such as links 26 may also be utilized to facilitate centering of the casing 20 and passage 22 with respect to the injector 4 and the mixing section 8. The link members also permit relative axial movement between the connected members 5 and 6, and the injector 4 and the mixing section 8, to compensate for relative normal growth of parts and movements resulting from passage of the high velocity, high temperature gases through the noise suppressor apparatus.

Figure 2:
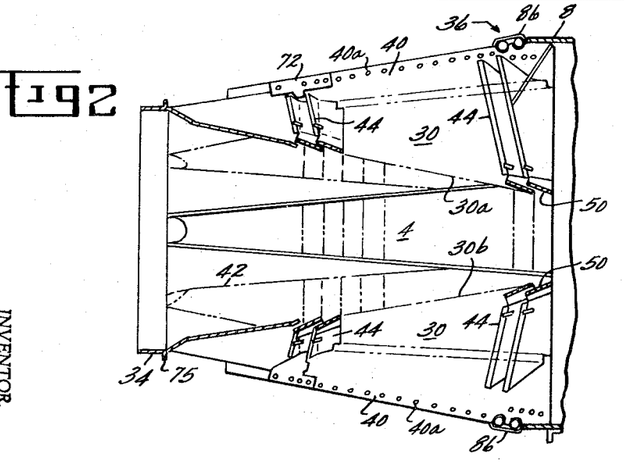
FIGURE 2 is a side view of the improved injector device partially in cross-section, with several of the structural members removed for visual clarity.
Figure 3:
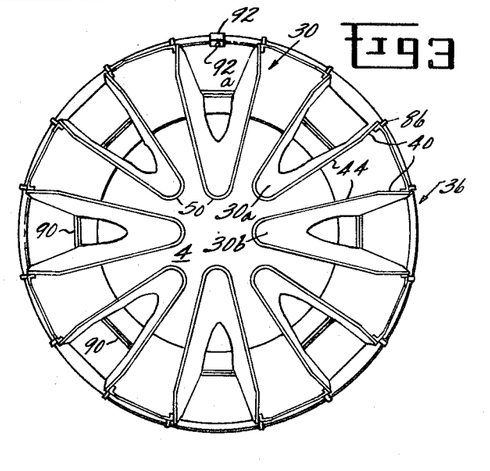
FIGURE 3 is an end view of the device of FIGURE 2 looking upstream of the direction of fluid flow.
Figure 4:
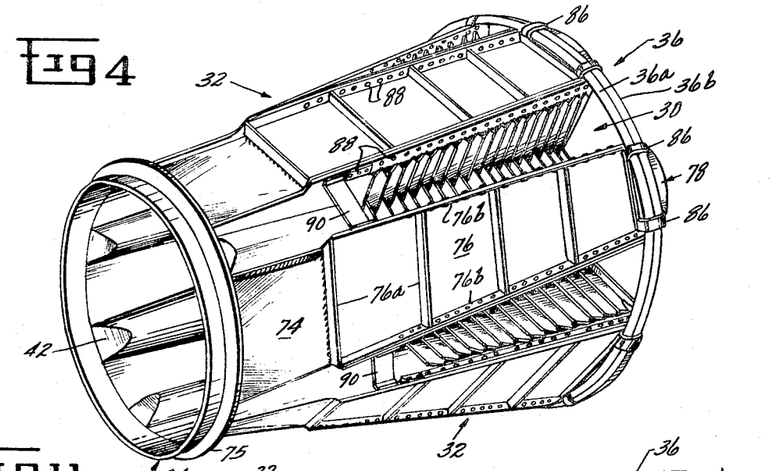
FIGURE 4 is a pictorial view of the improved "daisy" type injector incorporating my invention.

As shown in FIGURES 2–4 the injector assembly 4 includes a plurality of lobes 30, generally triangular in cross-section circumferentially spaced around the injector axis. As shown, the lobes may consist of an equal number of alternatingly arranged small and large lobes 30a and 30b, respectively. Other arrangements will suggest themselves to those skilled in the art but, in any event, number, arrangement, axial length and radial penetration of the lobes will be dependent on the desired amount of cooling air flow, hot gas velocity and other obviously significant factors.

As illustrated generally in FIGURE 4, the injector shell or outer periphery is formed by a series of panel members, indicated generally at 32, also arranged about the injector axis. Ring means, indicated generally at 34 and 36 at the small (entrance) and larger (exit) end of the device 4, respectively, are also provided. In short, the improved injector-suppressor device 4 of my invention is a hollow, frustro-conical member having a series of deepening—in the downstream direction—generally triangular projections extending radially inwardly towards the injector axis. The projections are actually troughs or chutes for introducing cooling air and being of generally lobular shape the device has been called a "daisy" injector.

Figure 5:
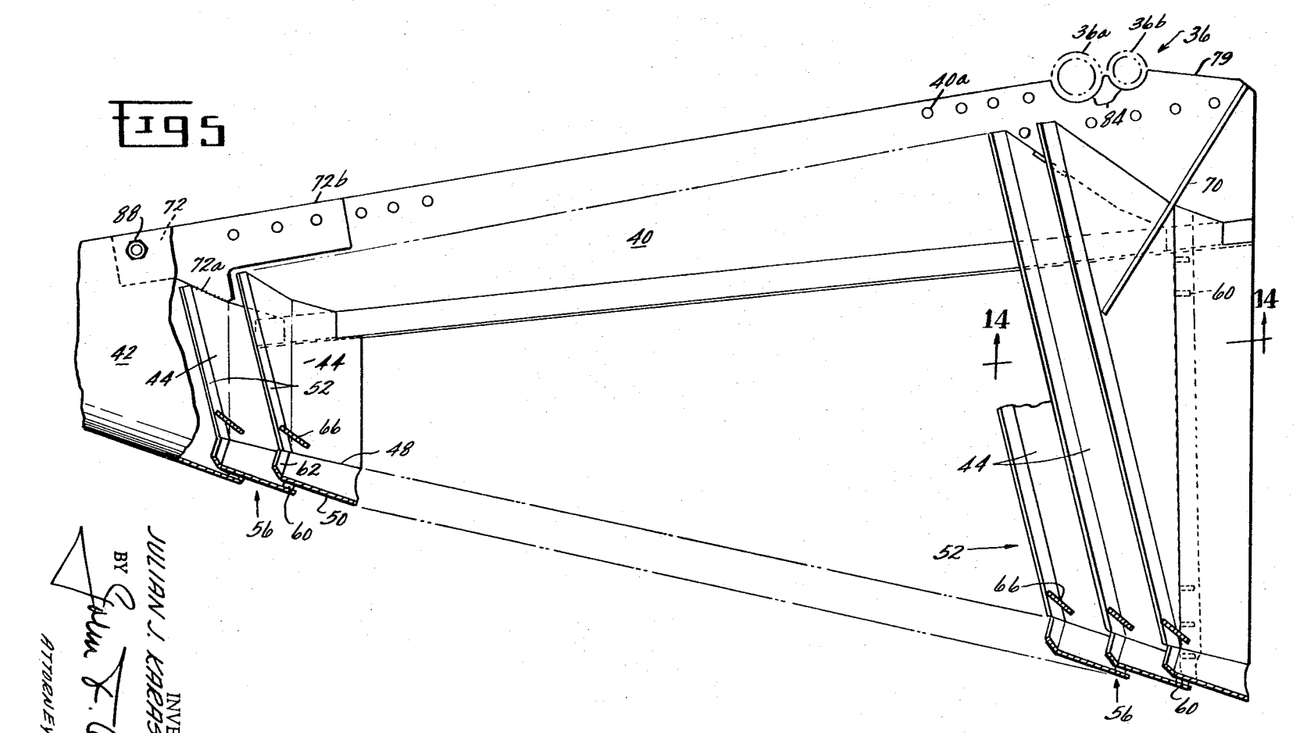
FIGURE 5 is an enlarged, partial view in cross-section taken along the axis of one of the lobes illustrating several features of the vaned wall construction.
Figures 6, 7:
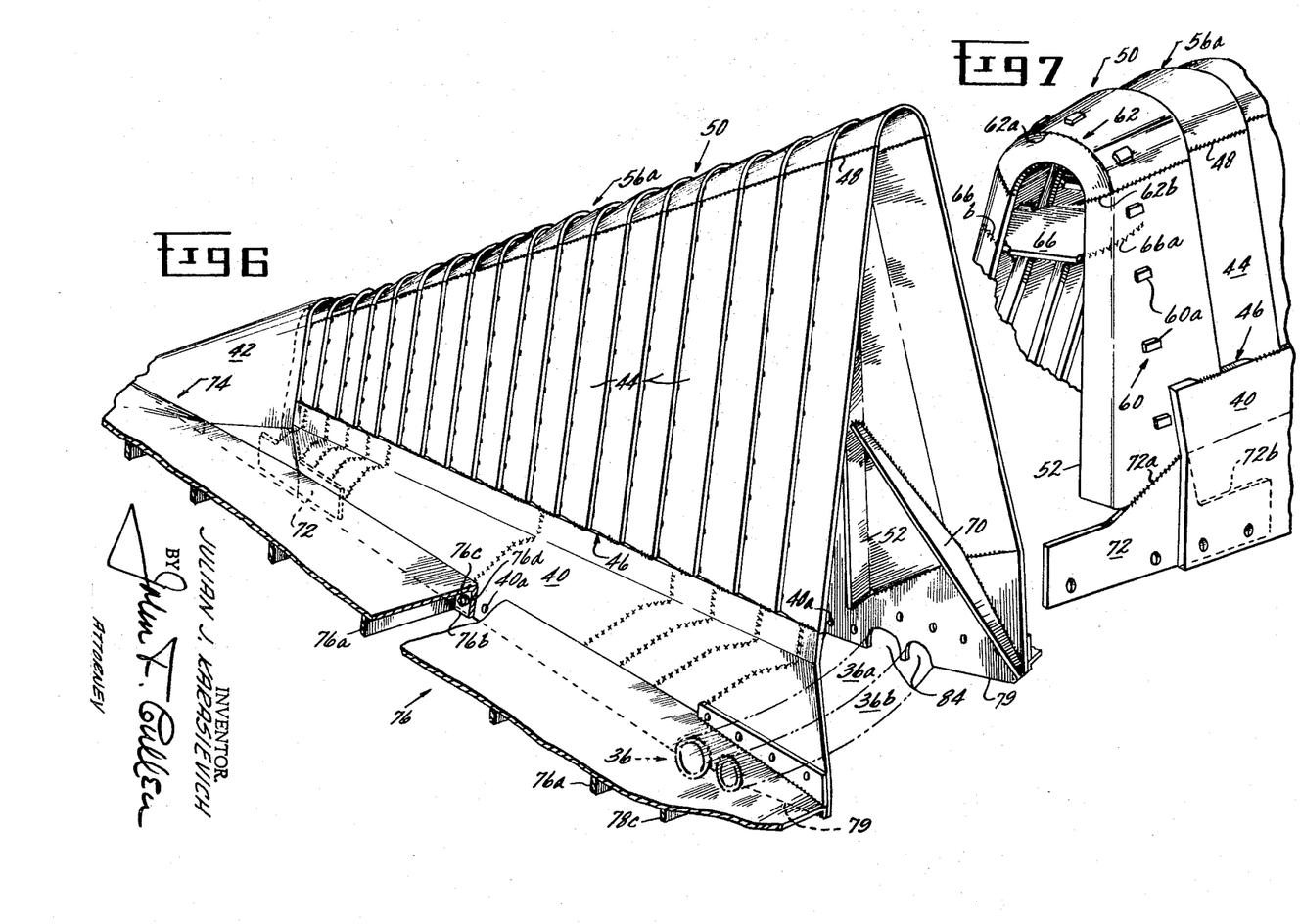
FIGURE 6 is a pictorial view of a single lobe, according to FIGURE 5, as viewed from the hot gas flow side of the injector.
FIGURE 7 is a partial pictorial view of one vane pair of the row of vanes forming a lobe wall with the solid wall end piece removed to illustrate construction details and means for control of the cooling air inlet opening size at the vane flanged edges.

As stated, a feature of my invention is an improved wall structure for the lobes 30. Referring more specifically to FIGURES 5 and 6, it will be noted that each lobe comprises a pair of base side frame members 40—40. Since the lobes are symmetrical the construction is repeated on each side and reference to either side will be descriptive of the other. As viewed in FIGURE 6, i.e., from the hot gas flow side with the direction of air flow from left-to-right, at the entrance the lobe preferably includes a solid structural member 42 adapted to be joined to members 40 to form a frame for each lobe. This leading edge, wedge-shaped piece 42 furnishes added strength and is convenient for attaching to ring means 34. It also serves to initiate a general flow of cooling air flow towards the vaned or louvered portion of each lobe, now to be described. As shown, each side of the lobe or continuation of the outer wall means 40 includes a series of generally rectangular pieces 44. Each piece 44 is specifically shaped at its outer end, at 46, to enable it to be joined to the frame member 40 in a manner designed to improve both the aerodynamic and mechanical functioning of the overall wall structure. Likewise, at its inner end, at 48, each piece is joined by a cap member 50 to another piece 44, in the same radial plane, to form paired wall members. While the frame or side members 40—40 illustrated have substantial depth, this may be varied, in accordance with the teachings of my invention, for differing cooling requirements, that is, for higher operating temperatures the lobe length or height may be increased, in which case the base or frame members 40—40 will narrow down to rail-shaped pieces.

Figure 14:
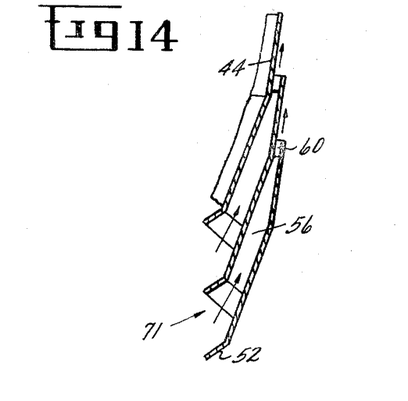
FIGURE 14 is a cross-section taken along line 14 of FIGURE 5.

Proceeding now to a more detailed description of the vane pieces 44, as seen in the drawings each piece is a tapered, quadrangular plate in which the ratio of the width to the length is generally uniform throughout the length of each inductor lobe. Thus, the width of the vane pieces of the pair at the exit end, adjacent ring means 36, is approximately twice that of the vanes of the pair at the other end. In addition, as perhaps seen more clearly in FIGURES 5 and 7, each vane is also preferably provided with a flange 52. The flange 52 is on the upstream or long edge of each piece 44 and projects out into the cold air stream. The flanges 52 may be joined to the pieces 44 or, as shown, provided by simply bending the edge of the piece at an angle. A suitable bend angle is in the range of 45°–60°, although the exact angle will depend upon the application for which the suppressor is designed. The flanges not only provide a specific shape to each opening in the rows or cascade of openings, indicated generally at 56, along each lobe wall, but also further strengthen or reinforce the otherwise flat vane piece 44. Further, the greater part of the overlapped surface portion of each vane piece, as seen in FIGURE 14, is not in the same plane as the exposed adjacent vane surface. That is, along a line parallel to the general direction of the lobe wall, each exposed vane portion or surface is given a slight bend inwardly just forward of the radial plane where the exposure (of the vane surface) begins, i.e., along the line common to dimensions Z and Y of FIGURE 9. To aid in maintaining the proper height of the cooling air passages in the overlapping vane areas, in particular, air passage spacers or pads 60, illustrated in FIGURE 7 are provided. These spacers or pads, are welded or permanently affixed to the outer vane surface in the area to be covered, and are rectangular and have their outer surfaces in abutment with the covering or overlapping adjacent-upstream-vane inner surface. An alternative to the welded on spacers 60 is a dimple raised on the outer surface of the vane, using die-forming, for example. A sufficient number of pads or dimples are spaced along the vane length to provide sufficient support and opening control, while not unduly interfering with the cooling air flow. In this manner there is provided a series or cascade of elongated openings 56 tapering from the inlet (to the cold air) side to the exit side, as shown by the small arrows in FIGURE 14. In one embodiment it was found advantageous to have a taper of approximately 2°–5° with a passage overall height in the range of .1 to .3 inch, with the smaller passages nearer to the entrance than the exit end of the lobe since the vane pieces are shorter near the injector entrance. I have found, with the described arrangement, that it is possible to utilize the total, rather than merely the static pressure in the cold air stream, to facilitate its injection into the hot gas stream.

While the lobe side walls are illustrated as comprising two pieces joined by the cap piece 50, obviously a single piece could be formed to provide the improved air induction means. However, as shown, each cap piece 50 will also include a flange 62, permanently attached to the upstream edge of each cap, at 62a, and the inner flange edges of each vane of a pair, at 62b—62b. If desirable, and necessary—for added strength—stiffener means 66 may be provided adjacent the caps and on the cold air side of the lobe. The stiffeners, when used, are welded to the vane pieces 44 and flanges 52 at 66a and 66b, respectively. Other arrangements of the overall construction just described will suggest themselves to those experienced in the art. For example, the caps and cap flanges 50 and 62, respectively, may be an integrally made piece, such as by deforming metal, to provide air passages 56a at the lobe crest. Stiffener piece 66 could also be integral with one or the other of the adjacent structural members.

Turning now to a description of the arrangement for attaching joined vane pairs, that is, the inner portion of the lobe walls to the frame members 40, as stated above, a feature of my invention is improved means for constructing lobe walls, i.e., supporting the vane members 44.

Figures 8, 9, 10:
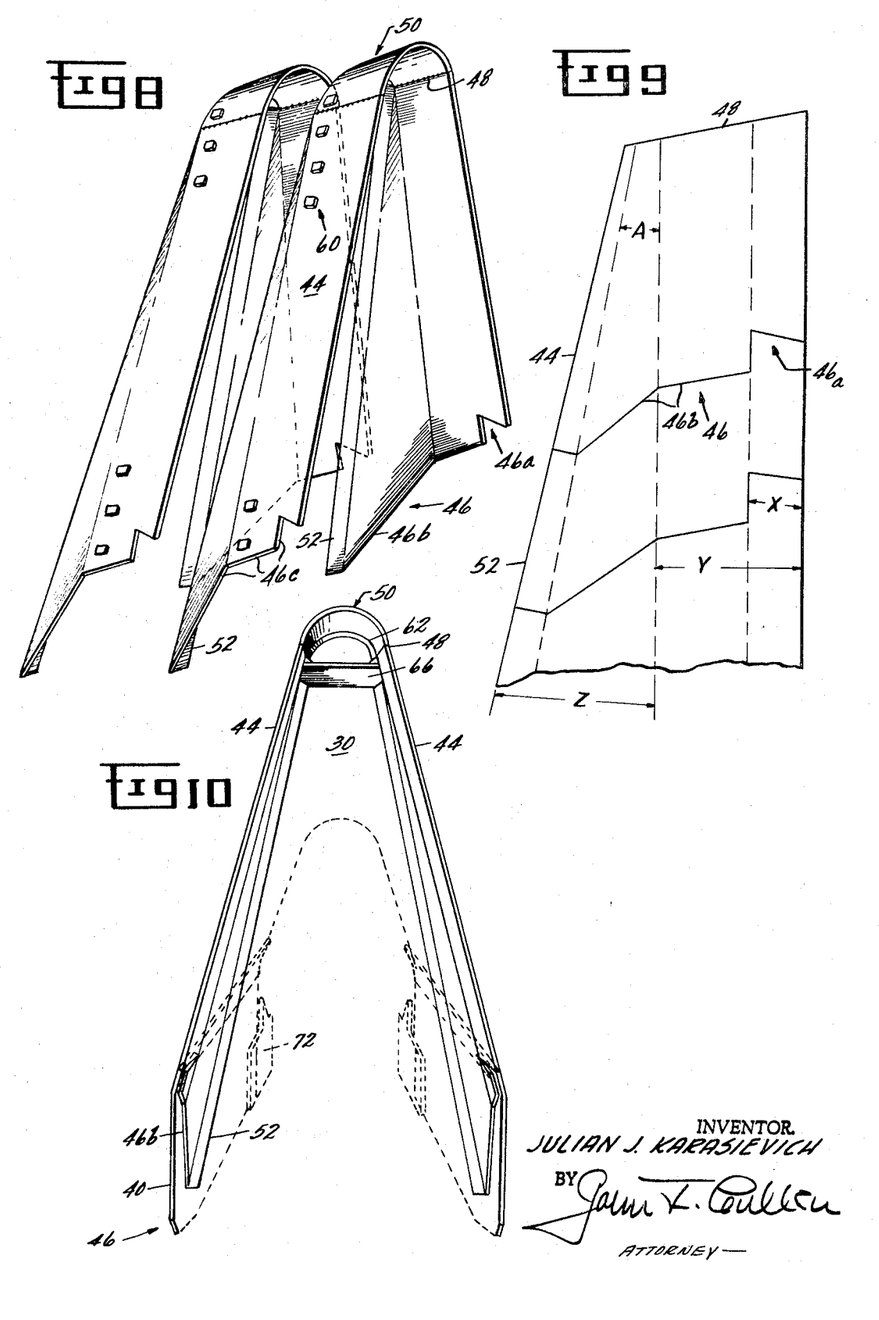
FIGURE 8 is a pictorial, exploded view of adjacent pairs of vanes further illustrating the construction details of FIGURES 5 and 7.
FIGURE 9 is a development view illustrating how the vanes of FIGURE 8 are laid out prior to fabrication, e.g. by welding to form the lobe side, and further indicating certain dimensional factors significant to the construction.
FIGURE 10 is a schematicized end view of a lobe, with partial removal of pieces, to further illustrate the cold flow area deepening or range of insertion and the aerodynamic, as well as mechanical functions of the cap and vane structure.

According to the invention, the vanes are cantilevered from a rigid structure in the injector device 4 in a manner permitting each pair of vanes to expand, bend and twist—independently of any other pair—in order to minimize the effect of stresses due to non-uniform temperature distribution along the surfaces of the lobes. As noted above, the vane pairs overlap with succeeding pairs of vanes resting on the spacer pads 60 of the downstream pair. At the outer ends, at 46, of each vane piece 44, I provide a notched and angled configuration of the vane piece edge to facilitate the vane-to-frame connection. Specifically, the trailing edge corner of each piece is notched at 46a to permit a portion of the vane to rest or butt against the inner edge of the frame member 40. Edge portion 46b is then stepped so that, as seen in FIGURES 2, 8 and 9 successive vane pieces may be permanently affixed to the frame in serial or cascade fashion. In other words, the vane pieces are cut back from the leading to the trailing edge, as perhaps best seen in FIGURE 8, for welding or brazing to the inside surface (i.e., the cold air side) of the frame members 40. As an alternate construction the notch 46a may be eliminated by placing the side members 40—40 outside of the original lobe envelope so that the cascade exit plane is coincident with the inside surface of the side members 40—40. In addition, the edge of the piece may itself be beveled, at 46c, at an appropriate angle to improve the mating joint with the inside surface 40a of member 40.

Referring specifically to FIGURE 9, to facilitate fabrication of my improved lobe configuration, I use a development layout, as shown in plan view, of the vanes. The improvement whereby the cascade wall structure formed by the vanes is strengthened and whereby air flow is uniformly maintained is due, in part, to control of dimensioning throughout the axial length of each lobe. Thus, dimension X in FIGURE 9 is the same from the largest to the smallest vane, as is dimension Y and angle A. Only dimension Z is allowed to change, i.e., grow smaller proceeding from the exit end back towards the entrance end of the lobe.

Further means of strengthening the structure are provided by anti-torsion ribs or stiffeners 70 and spacers located adjacent the exit end of each lobe, the spacers being illustrated at 71, in FIGURE 14. For a more rigid connection of the vane piece—side frame assembly to the wedge-shaped piece 42, extension plates 72 may be axial and welded at 72a and/or 72b to frame member 40.

As stated above, the "daisy" type injector device 4 of my invention also incorporates features designed to improve or facilitate maintenance and overhaul. The vane cascade structure just described, however, serves to greatly reduce the need for periodic maintenance. That is, while previous lobe construction often utilized punched crescent-shaped louvers for introducing cooling air, under some circumstances such designs were susceptible to cracking under extreme heat. Crack progression sometimes would follow rapidly, during after-burning operation, in particular, occasionally leading to collapse of the lobe. Also, such designs are sensitive to the overall direction which the gas stream takes in passing through the inductor lobe, which can result in a varying cooling air film distribution. Furthermore, the very nature of the punched type louver itself prohibits the use of the best high temperature material of a thickness sufficient to withstand the extreme heat of such higher velocity gas streams. Accordingly, while maintenance is greatly minimized with the above described construction of my invention, wherein cooling flow is much more uniform with the passages 56 having uniform dimensioning and specific shape and the vane pairs being allowed to independently flex and twist, I nevertheless have also found it desirable to improve the overall structure of the device 4 to permit its easy removal and to further permit disassembly of individual lobes 30.

Figures 11, 12, 13:
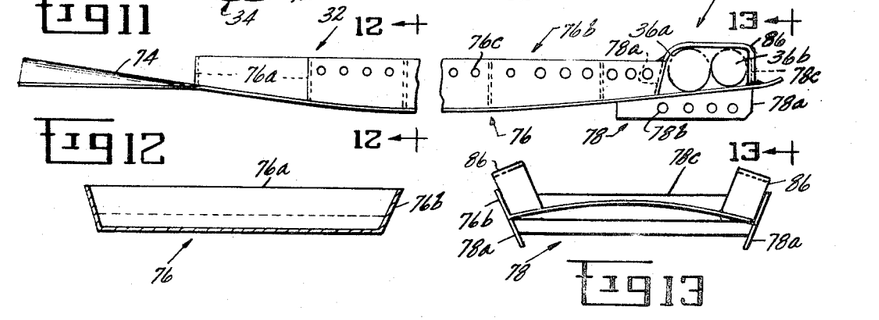
FIGURE 11 is a side view of an intermediate panel section of the injector device illustrating the axial curvature or contouring used to obtain an improved temperature distribution.
FIGURES 12 and 13 are views taken along lines 12—12 and 13—13 of FIGURE 11.

To this end, as seen in detail in FIGURES 11–13 the mixer device 4 outer periphery or shell also includes an improved design for joining the lobes to members or panels 32 and making the injector 4 self-supporting when removed from suppressor 1. Each panel comprises a forward portion 74, center portion 76, and an exit or rearward extension or portion 78. The forward portion 74 at the entrance end of the device, as shown in FIGURE 4, is joined to ring means 34 at the front end of the injector assembly 4. The assembly may include a stiffening member 75. The center portion 76 has a series of axially-spaced flanges or ribs 76a for additional strength. The center portion of the panel 32 also has axially-extending side flanges 76b—76b having bolt holes 76c and bolts 76d whereby the panels are attached on each side to the adjacent lobes 30. Accordingly, as shown in FIGURE 6, the bottom portion of each frame member 40 likewise includes holes 40a adapted to be aligned with holes 76c in the panel side flanges for attaching the lobes 30 to the panels 32 in assembling the injector. Portion 78 of panel 32, on the other hand, includes dropped side flanges 78a—78a, having holes 78b, for clearance of the forward ring means 36, now to be described in detail. The panel portion 78 between the flanges 78a—78a is merely an extension of the panel portion 76, as is portion 74. A strengthening flange or rib 78c may be added but, in any event, the panel wall portion has the curvature, as shown in FIGURE 11. The end section or extension 78 of panel 32 is adapted to be inserted into the mixing section 8 of the noise suppression device 1, as best seen in FIGURE 2. As the curved sections slide into the cylindrical section 8, which is itself supported through the mounting pad and intake assembly, the injector-suppressor assembly 4 is fixedly maintained in the desired position, but is easily removed. As seen in FIGURE 5, the assembly 4 actually includes a series of bearing points at 79, at the downstream end of frame members 40, which rest on the inside surface of mixer wall 8.

To facilitate removal of the device 4, the wall 80 at the forward end of the annular secondary air inlet means 20 may be in the form of a detachable member, bolted at 80a, to a conical portion 82. If desired, wall means 80 may be split along a horizontal center line for ease of removal of the injector-suppressor assembly 4.

When removed the "daisy" injector 4 is further strengthened by a unique arrangement utilizing ring means 36, which further permits easy removal of each lobe 30 individually in the event one or more become damaged or worn through use. Referring specifically to FIGURES 4 and 6, it will be noted that the extreme downstream ends of frame members 40 include a pair of copes 84—84 aligned in a radial plane so as to receive ring means 36. The ring means preferably includes a pair of axially spaced hollow tubular members 36a and 36b extending circumferentially of the device 4. The tubular members are held in position by a series of retaining clips 86. The clips are spaced about the circumference of the reinforcing rings 36a and 36b and simply grip the rings. The dimensioning of the injector 4 is such that the larger end springs out to a dimension-diameter-slightly larger than the diameter of the mixer 8. With the chamfered corners on the lobe side rails the daisy injector 4 large end can easily be sprung inward and inserted into the mixer 8. When installed the clips 86 are close to the rings, i.e., just short of touching them. When the mixer expands with heat, its thermal growth rate will be higher than that of the rings, and as a result the retaining clips will move away from the rings 36a–36b. The clearance between the rings and the bottoms of the copes 84—84 is such that this thermal expansion is allowed. It will therefore be noted that the double, semi-circular copes 84—84 are slightly larger than the diameter of the tubular members, with the leading member 36a itself being slightly larger than member 36b. Actually the members perform both an aerodynamic and a structural function. That is, structurally the rings 36a–36b are effective only when the assembly 4 is removed from the suppressor 1, i.e., when the clips are gripping the rings. The rings add strength to the assembly particularly in the event a lobe 30 is to be removed for repair purposes, for example. In other words, with one lobe removed the structure will not collapse inwardly on itself due to the ring means 34 and 36 reinforcing and adding rigidity—particularly during handling—of the sheet metal assembly which comprises the injector device 4. Lobe removal is, of course, greatly simplified since if bolts 88 along the frame sides are removed the lobe simply drops out. A stiffener 90 is added, as seen in FIGURE 4, to provide greater control of the hot gas flow area at the location of the bolted joint between the solid wall lobe portion and the cascade lobe portion because clearances in the holes for bolts may cause shifting of components, i.e., bulging outwards. A clevis 92 has hole 92a matching a hole in the mixer tube 8, at 12 o'clock, into which a pin (not shown) is temporarily dropped to hold the "daisy" injector in position while the duct 20 is being installed.

When in place, as perhaps best seen in FIGURE 2, the rings perform an aerodynamic function in the suppressor 1. That is, they eliminate what would otherwise be a sharp edge over which the secondary air flows from the injector-suppressor or "daisy" injector 4 into the mixing section 8 located downstream thereof. It will also be noted that the downstream end of the injector device 4 projects into the cylindrical mixing section 8, thus eliminating the possibility of leakage at this point.

A further aerodynamic feature incorporated in the structure of the improved "daisy" injector of my invention concerns the control of the hot gas flow through the assembly 4. That is, the "shell" or outer periphery of the injector assembly 4 as defined by the panels 32 is controlled to give these areas a bell-shaped configuration. Thus, as seen in FIGURES 11–13 the panels 32 which close the areas between the lobes 30 are curved axially, but are straight tangentially with respect to the injector (suppressor) axis. The tangentially straight configuration is preferably used when the production of a small number of injectors does not warrant the expense of forming dies. Where the cost of forming tooling is warranted the tangential and axial curves may be formed by a stretch forming process. As shown in FIGURE 11, specifically, panel portion 76 up to the beginning of portion 78 is bowed from end-to-end, but as seen in FIGURE 12 is a flat piece in cross-section. Portion 74 is curved or arcuate to match the ring means 34 at one end of the mixer assembly 4. Basically, the concept involved is a constant rate of increase of hot gas expansion. That is, realizing that the cross-section path of the hot gas is increasing at a non-linear rate at any given location along the length of the assembly, I perceived that more uniform temperature control would be possible if the increase were constant, or nearly so which could be obtained by curving the panel 32. With area control, for example, it was found that the typical temperature concentration at or near the edges of the caps 50 of the vaned lobe wall, i.e., the part of deepest penetration, was spread out more uniformly over the major portion of the entire lobe crest than had theretofore been possible. Tests indicated a breaking up of the normally existing single aerodynamic shock near the large end of the mixer into a series of smaller shock waves progressing upstream of the lobe. This arrangement, plus the above-described improvements in the control of flow by way of dimensioning of the air gaps between the vanes and the mechanical support features, have been proven to have greatly increased the service life and efficiency of the noise suppressor 1.

While I have emphasized the use of the invention in general-run-up or maintenance operations, it may be desirable to incorporate my improved injector construction in airborne flow mixing or sound suppressor devices, such as are found incorporated in modern aircraft jet engines used for commercial air transport.

While particular embodiments of the apparatus incorporating my invention have been described or discussed, other modifications and changes within the scope of my invention will suggest themselves to those skilled in the art. It is my intention that all such changes, modifications, and alternate embodiments be covered by the appended claims.

What I claim and desire to secure by Letters Patent of the United States is:

1. A noise suppression inductor structure means for a reaction engine comprising:

a frame, said frame having a forward wedge-shaped member generally triangular in cross-section and of increasing radial depth with respect to the suppressor axis in the downstream direction, and a pair of side members extending downstream from the edge of said wedge-shaped member, the radial depth of said side members being substantially less than that of said wedge-shaped member at the downstream edge thereof;

a plurality of generally rectangular, high temperature resistant wall members, said wall members being arranged along said side members and affixed at either end thereof to respective ones of said side members, each of said wall members being curved back on itself to form a crest portion for said inductor means in cooperation with the apex of said wedge-shaped member, said wall members being divergent from the crest apex, whereby said inductor means is generally triangular in cross-section and of increasing radial depth in a downstream direction, the upstream edges of the wall members on each side of the inductor means including flange means bent towards the opposite side to form a plurality of slot-like openings, said openings being continuous and in planes parallel to each other and generally perpendicular to the direction of said secondary air flow, whereby a portion of said air flow in said inductor means is directed outwardly and along said inductor wall members for surface cooling thereof.

2. Apparatus as described in claim 1 in combination with tubular duct means adapted to receive a hot engine exhaust stream, said duct means including an inlet, end, a fluid mixing section, a sound absorbing and flow diffusing chamber and an outlet end wherein said suppressor structure is disposed between said inlet end and mixing section.

3. A waterless noise suppressor apparatus for jet engines comprising:
generally tubular means arranged to receive the hot engine exhaust gas stream, said tubular means including an inlet end, a fluid mixing section, a sound absorbent and diffusing section, and an outlet end in axial series flow relation;
shroud means surrounding said inlet end, said shroud means forming an annular secondary air passage in cooperation with said tubular means, said annular passage being open to atmosphere to provide a source of secondary cooling air;
a secondary cooling air injector-suppressor assembly located intermediate said inlet end and said fluid mixing section of said tubular means, said injector-suppressor assembly including,
  (a) a plurality of lobular passages spaced peripherally about the injector-suppression axis, and lobular passages being generally triangular in cross-section and in flow communication at the upstream ends thereof with said annular secondary air passage, said lobular passages increasing in radial depth in a downstream direction and discharging said secondary air flow into said mixing section, whereby the temperature of said engine exhaust gas stream and noise attendant its passage through said fluid mixing section is reduced,
  (b) wall means defining the radial dimensions of said lobular passages and comprising a plurality of generally rectangular wall members, and a pair of spaced frame members, said frame members extending axially of and being supported in said suppressor at the periphery of said tubular means, the ends of said wall members being curved back on each other and attached to respective ones of said frame members to form a generally arcuate crest defining the maximum radial depth of said lobular passages,
  (c) flanges on the upstream edges of said wall members, said flanges being bent inwardly of the lobular passages to capture a portion of the secondary air flow therethrough, each of said flanges being overlapped by a portion of the inner surface of the adjacent downstream wall member to provide a plurality of continuous, slot-like openings extending over the major portion of the wall means defining said lobular passages, whereby the surface of said major portion of said wall means is provided with a uniform covering film of cooling air, thereby reducing the maximum, as well as the average surface temperature of said wall means.

4. The apparatus as described in claim 2 wherein said injector-suppressor assembly includes spacer means located between adjacent overlapped and overlapping wall member portions, said spacer means being effective to maintain a minimum height in said slot-like openings, said spacer means being affixed to one of said adjacent portions only, whereby adjacent wall members flex and twist independently of each other, as a result of nonuniform temperature distribution over said surface, thereby reducing thermally-induced stresses in the injector-suppressor wall members.

5. In a waterless noise suppressor adapted to receive a hot jet engine exhaust gas stream for axial flow therethrough, an improved secondary cooling air injector-suppressor assembly comprising:
  first ring means, said first ring means being located at the entrance end of said injector-suppressor assembly;
  second ring means, said second ring means being located at the exit end of said injector-suppressor assembly;
  a plurality of axially-extending, circumferentially-spaced panel members secured to said first and second ring members, said panel members at least partially defining the outer boundary for area control of the hot exhaust gas stream flowing through said injector-suppressor assembly;
  a plurality of cooling air inductor lobes located intermediate the panel members, each of said lobes including an imperforate upstream portion, a pair of spaced frame members connected to said imperforate portion and extending downstream thereof, and a plurality of side wall members extending downstream of said imperforate portion and generally radially-inwardly of said injector-suppressor assembly to at least partially define an inner flow path boundary in said injector-suppressor assembly for the greater portion of said cooling air stream flowing therethrough, said side wall members defining a plurality of slot-like openings extending uninterruptedly from one frame member to the other, said openings lying in a series of axially-spaced, parallel planes substantially perpendicular to the axis of said assembly, the total length of the opening in each plane progressively increasing in a downstream direction from said imperforate member, thereby providing a thin uniform film of cooling air on the surface of said side wall members adjacent the hot gas stream and fastening means removably connecting said frame members to said panel members along the axial edges thereof.

6. Apparatus according to claim 5 wherein said imperforate portions of said inductor lobes each comprise a wedge-shaped member of generally triangular shape, in cross-section, said member being of increasing radial depth in a downstream direction with respect to the injector-suppressor axis, said member adapted to receive cooling air flow and having axially-extending portions thereof permanently fastened to the forward portion of said adjacent panel members along the axial edges thereof, and wherein said first ring means comprises a cylindrical member, said cylindrical member being fastened to said imperforate members to form a rigid forward support structure in said injector-suppressor assembly.

7. Apparatus according to claim 5 wherein said second ring means comprises a pair of hollow tubular members circumferentially arranged about and loosely engaging said panel members at the outer periphery of said injector-suppressor assembly, and a plurality of retainer means circumferentially spaced about said tubular members, said retainer means being attached to said panel members and being in an overlying relationship with respect to said tubular members, thereby permitting said tubular members to expand at a different rate of thermal growth than said injector-suppressor panels when said assembly is installed in said suppressor, said tubular members cooperating with said first ring means for self-support of said injector-suppressor assembly when said assembly is removed from the suppressor.

8. Apparatus according to claim 5 wherein said fastening means comprise a first plurality of radial flange means on the axially-extending edges of said panel members having a plurality of holes therein, said flange means holes being aligned with a plurality of holes in said frame members, and a plurality of bolt members received and secured in said aligned holes, whereby on removal of said bolts individual inductor lobes may be rotated about the axis in the radial plane of said second ring means for removal thereof from said injector-suppressor.

9. Apparatus according to claim 5 wherein said slot-like openings include a plurality of spacer means extending transversely thereof, said spacer means being affixed to one of said wall members, whereby adjacent wall members are permitted to pivot and flex individually as a result of non-uniform temperature distribution, thereby reducing thermally-induced stresses in said wall members.

10. Apparatus according to claim 9 wherein said wall members include flange means at least partially overlapped by the adjacent downstream wall member, and wherein said overlapped and overlapping portions of the respective side wall members form said slot-like openings.

11. Apparatus according to claim 10 wherein said openings are of generally uniform height throughout the axial length of said inductor lobes, and wherein said openings taper from the cold air side to the hot gas side of flow through said injector-suppressor assembly, thereby maximizing the effective cold air flow therethrough.

References Cited

UNITED STATES PATENTS 3,227,240   1/1966   Lee et al. _____________ 18—33

FOREIGN PATENTS 1,201,893   7/1959   France.
920,328   3/1963   Great Britain.
920,329   3/1963   Great Britain.

ROBERT S. WARD, Jr., *Primary Examiner.*

U.S. Cl. X.R.

239—265.11